May 21, 1963  J. BANNER  3,090,084
MOUNTING FOR SLIDING PANELS FOR DOORWAYS AND THE LIKE
Filed May 16, 1960
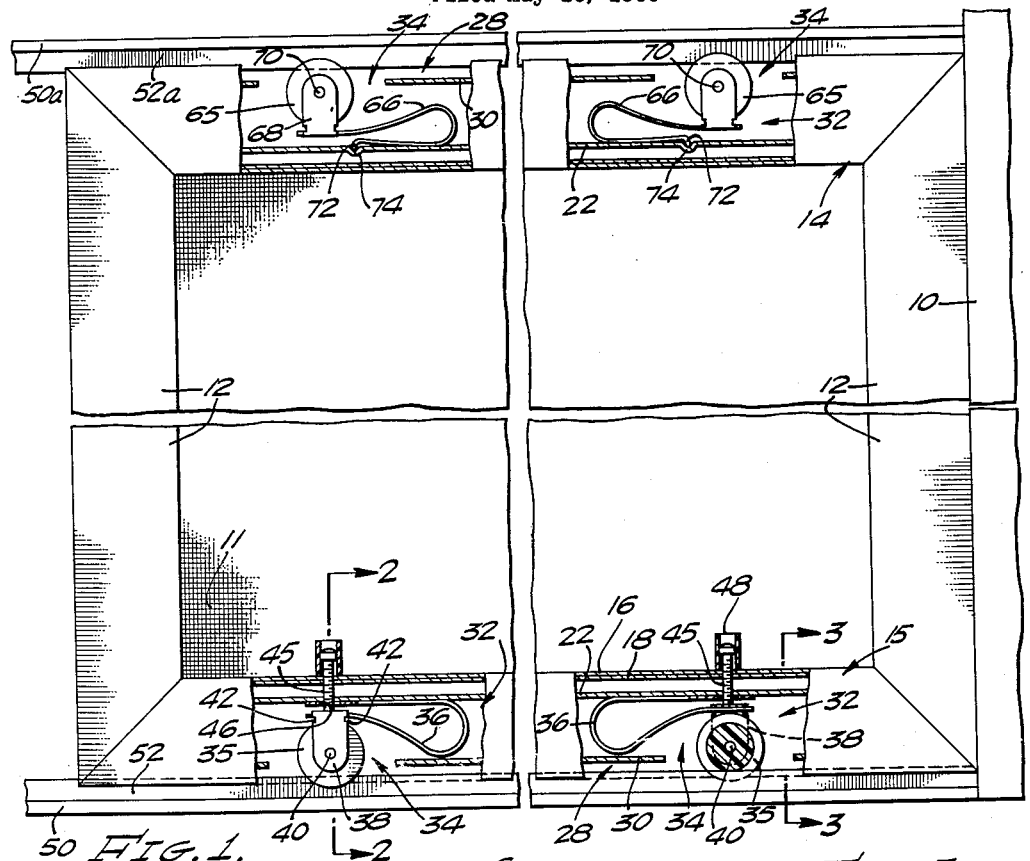
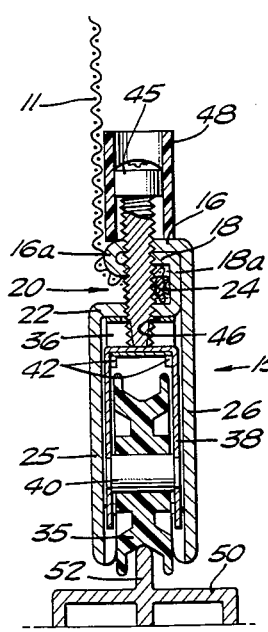
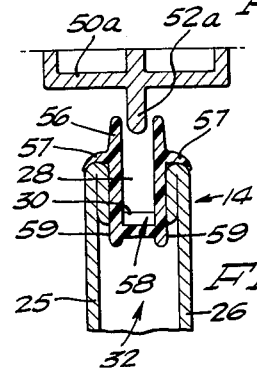
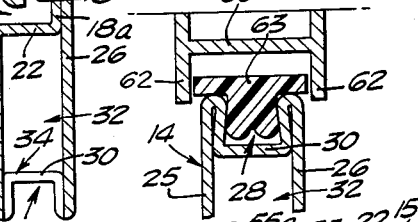
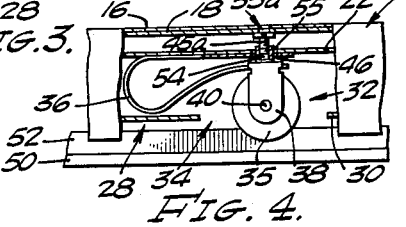
INVENTOR.
JOSEPH BANNER
BY Reed C. Lawlor
ATTORNEY

United States Patent Office 3,090,084
Patented May 21, 1963

3,090,084
MOUNTING FOR SLIDING PANELS FOR DOORWAYS AND THE LIKE
Joseph Banner, Whittier, Calif., assignor to Anjac Mfg. Co., El Monte, Calif., a co-partnership
Filed May 16, 1960, Ser. No. 29,220
8 Claims. (Cl. 20—19)

This invention relates to sliding panels for use in the closing of openings in buildings such as doorways, and has reference especially to mountings for screen doors, other sliding door panels, and the like.

A particular object of the invention is to provide a mounting for the lower end of a sliding panel, typified by a screened frame, which will preclude unintentional dislodgement of the lower end of the sliding structure from a track upon which the sliding structure is characterisically supported and along which it travels.

It is conventional practice to mount sliding screen doors and the like upon tracks located across doorways, such mounting being effected through the medium of guide wheels or rollers set into the lower ends of the door frames. Quite commonly with structures heretofore used, these wheels leave or jump the tracks as the doors are being moved to either open or closed position, and this is especially true of screen doors and other light doors, this probably being due at least in part to the much lighter weight of screen doors than of glassed panel doors. Also, there is an inherent tendency for adults especially, when undertaking to slide doors along tracks upon which they are mounted, to lift that side of the door carrying the operating handle. This tendency often results in the lifting of the supporting wheels, or at least one of such wheels, far enough with respect to the track upon which they are intended to ride to cause them to leave the track during the operation.

It is therefore an object of the present invention to so mount the supporting wheels or rollers of sliding screen door panels, and some other panels, that the wheels upon which they are carried will not jump the tracks during opening or closing operations.

A further object of the invention is to provide a mounting for wheels of doors of the indicated type such that the wheels will tend to remain down in operating position upon the tracks when door movement is effected, and so that such mounting wheels will not follow the door upward under conditions as above indicated, but will remain on the tracks.

Characteristically, the wheels or rollers for sliding panels either travel between separated track members, or such wheels are grooved pulley-fashion to straddle a single track member. With either type, spring means constituting one aspect of this invention serve to retain the edges of the wheels or rollers in proper engaging position between or about the supporting track elements so as to guide the screen along the track.

It is therefore an additional object of the invention to mount supporting wheels or rollers for sliding panels of the indicated character so that they are biased or urged downward by spring means of a type for positively retaining such wheels or rollers upon the tracks whenever the screen frames or other sliding panels structures are caused to be lifted upward a distance sufficient otherwise to dislodge the wheels or rollers.

It is a still further object of this invention to provide, in conjunction with the retention of the supporting wheels or rollers upon their tracks, appropriate adjusting means for tipping a sliding door panel frame and maintaining it tipped in such adjusted position, whereby properly to position or space the closing stile of the panel with respect to the closing jamb of the doorway or other building opening against which the screen door or other panel is normally closed.

Thus, it is also an object to overcome structural difficulties commonly encountered which otherwise result in lack of parallelism between the jamb of a doorway and the adjacent stile of the frame or panel which is to be moved into closing relationship therewith.

It is therefore a still further object of the invention to employ as mounting means for wheels of sliding panels, spring means, especially leaf spring means, which both carry mounting wheels for the panels and are at the same time engaged by adjusting means, such as adjusting screws, for supporting the sliding doors or other panels and providing for adjustment of the closing stiles of the panels with respect to the door jambs against which they close.

An additional object of this invention is to provide resilient means both to position the mounting wheels at the lower end of a screen door frame or similar panel, and to cushion and space the top portion of the panel against an overhead track means or guide means, whereby the entire sliding panel is spaced and cushioned in proper relationship in its installed position within or adjacent the doorway which is to be closed.

Other objects of the invention, together with the various features of construction, will become apparent to those skilled in this art, upon reference to the following specification and the accompanying drawing wherein certain embodiments of the invention are illustrated.

In the drawing:

FIGURE 1 is an elevational view of a screen door constructed from aluminum or other suitable metal framing and equipped with the improvements of the present invention, portions being broken away to show internal construction and arrangement;

FIG. 2 is a vertical cross-sectional detail taken on the line 2—2 of FIG. 1;

FIG. 3 is a cross-sectional view taken on the line 3—3 of FIG. 1;

FIG. 4 is a vertical sectional fragment showing a modified form of spring mounting;

FIG. 5 is a fragment of an optional positioning means usable at the top of the door frame of FIG. 1;

FIG. 6 is an enlarged vertical section taken on the line 6—6 of FIG. 5; and

FIG. 7 is an enlarged vertical sectional detail of a further modified form of positioning means for the top of the screen door frame of FIG. 1.

The drawing illustrates a sliding screened frame or screen door as representative of any appropriate panel embodying the present invention and adapted to be closed against a vertical door jamb 10. Here, a standard woven metal screen 11 is shown as being secured to a metal screen door frame or the like which includes upright side frame members or stiles 12, an upper transverse rail or frame member 14, and a lower transverse rail or frame member 15. These four frame members 12, 14 and 15, which are structurally formed alike, are mitered and secured together at their corners in any conventional manner. The construction of each of these frame members is seen in the enlarged cross-sectional showing of FIG. 2 and in that of FIG. 3, each member being formed by rolling, bending and otherwise appropriately shaping a piece of metal, characteristically aluminum alloy, into the desired configuration indicated. Here, the edges of the metal sheet are brought together and crimped to form an upper overhanging top wall 16, and an underlying upper wall 18, around which the outermost edge 16a is rolled to provide an exposed rounded edge and to form a screen receiving groove 20 which is directed outwardly and whose lower side is formed by an underlying ledge 22. The back of such groove is formed by an integral vertical portion 18a of the horizontal wall 18 and of the ledge 22. The screen 11 is typically anchored by being crowded into the groove 20 and is retained therein by an anchor or spline 24 of circular cross-section formed from typical flexible plastic tubing or rod well known in the art for this purpose.

Below the groove 20 as viewed in FIG. 2, each frame member is formed to provide a flat outer wall 25 integral with the ledge 22 and a flat inner wall 26 integral with the overlying top wall 16. As seen in the cross-sections of FIGS. 3, 6 and 7, the outer edge portion of each frame member is doubled back on itself to provide an outwardly directed open channel 28 which has an inner or bottom wall 30 formed by such operation. Thus, in addition to the outwardly opening channel 28, there is formed an internal enclosed channel 32.

In the case of the bottom rail 15, and also in the case of the top rail 14 where the upper positioning means of FIG. 1 are used, the inner wall of the outwardly directed channel 28 is cut away, as are the corresponding side wall portions where the walls 25 and 26 are reversely bent, thereby providing as many openings 34 in the wall 30 as there are mounting wheels 35 now to be described. These mounting wheels 35 are positioned by means of reversely bent leaf springs 36 as seen in FIG. 1.

The openings 34 in the wall 30 which divide the outwardly opening shallow channel 28 from the relatively deeper enclosed channel 32 are ordinarily two in number to accommodate two supporting wheels 35, such wheels 35 by reason of their mounting on the reversely bent leaf springs 36, are adapted to move inward and outward from an innermost adjusted position as seen in FIG. 1 to an outermost largely exposed position (not illustrated) where such outward movement is limited by contact of the adjacent portion of the respective spring 36 with the adjacent portion of the channel wall 30. Each wheel 35 is mounted on the floating or swinging end of its leaf spring 36 through the medium of a U-shaped bracket or stirrup 38 carrying a pivot member 40 for the respective wheel 35. This bracket 38 in each instance is mounted rigidly in position as by inwardly directed integral clamping tongues 42 (FIG. 2) which bind under the respective end portions of spring 36. Longitudinal movement of the stirrups or brackets 38 along the spring may be positively prevented by notching the adjacent side portions of the spring 36 slightly to accommodate about half the thickness of the respective bracket wall 38, such as is represented by the extra width of the spring over the inner spacing of the legs of the bracket 38 shown in the middle of FIG. 2 above the bight of the bracket 38. Thus, whatever the operating positions of the wheels 35, their brackets 38 and the respective swinging ends of their springs 36, the indicated relationships are positively maintained.

As to the mounting of the innermost or fixed end of each reversely bent spring 36, this is best illustrated in FIGS. 1 and 2 wherein vertically positioned self-tapping screws 45 are positioned in holes immediately above the respective wheel brackets 38 and are threaded through the horizontal walls 16 and 18 of the innermost overhanging portion of the lower rail or frame member 15, and are also threaded through the transverse wall 22 forming the bottom of the screen receiving groove 20 and the top of the enclosed elongated channel 32. The innermost or stationary extremity of each spring 36 is provided with an aperture in the form of a circular hole 46 (FIG. 2) through which the inner end of the respective screw 45 passes into engagement with the top wall or bight of the respective bracket 38. In this manner, each screw 45 performs the double function of preventing longitudinal movement of the spring 36 within the enclosed channel 32 and of adjustably positioning the upward limit of movement of each wheel 35 when the weight of the screen 11 and its frame is supported upon an appropriate track as seen in FIGS. 1 and 2. Since each screw 45 is required to be adjusted by a screwdriver, and since such screw is located closely adjacent to the screen 11, it is advantageous to provide a suitable protecting and guide sleeve 48 applied over the upper portion of the screw. Such sleeve desirably is a piece of rubber or synthetic tubing that is forced downward over the head of the respective screw 45 and thereby expands slightly at the head and contracts slightly below the head of the screw, whereby to resist unintentional dislodgement.

With respect to a track structure upon which the wheels 35 travel as the panel is slidably moved, such a track is illustrated in FIGS. 1 and 2 as a metal track 50 which may, as best seen in FIG. 2, be extruded or otherwise formed into the illustrated configuration, and in any event, includes a single upstanding rail or track member 52 where the wheels are provided with a V-shape or other pulley groove as illustrated. Since there is commonly at least some slight discrepancy either in the horizontal positioning of the track 50 and the vertical positioning of the door jamb 10 against which one of the stiles 12 is to close when the panel is moved into door-closing position, the screws 45 serve admirably the desired purpose of varying the relative positions of the wheels 35 with respect to the lower edge of the bottom rail or screen frame member 15 in which they are mounted, and thereby perfectly face or position the respective stile 12 of the screen panel alongside the door jamb 10 against which the screen door panel is to close. In current building constructions where sliding doors, whether sliding wooden doors or sliding glass or sliding screen doors are used, want of absolute perpendicularity between the bottom of the doorway and the adjacent door jamb 10 is so common that adjustment of the sliding panel with respect to the door jamb is in nearly every instance necessary. The screws 45 serve for this adjustment. The mounting springs 36 thus provide both for the indicated adjustment of the wheels 35 by the screws 45, and the avoidance of unintentional dislodgement of the wheels 35 from their mounting on the track portions 52, where, when there is a tendency for the screen frame to be lifted, the wheels 35, under influence of their springs 36, compensate for such upward movement and therefore remain at all time in contact with track sections 52. When it is desired to remove the screen panel from the doorway, a tool, such as a screwdriver, is inserted under the lower rail or frame member 15 and under the flange of one of the wheels 35 so as to hold such wheel 35 up in the channels 28 and 32 while the screen panel is being lifted. Then, the respective portion of the frame or panel may be angled across until the rearward flange portion of the wheel 35 is disengaged from the track member 52. Upon repeating the same operation with the other wheel 35, the lower end of the screen panel may be moved outward and downward so that the upper end of the panel is disengaged from its operative position.

A variation of the adjusting arrangement to accomplish the same result as produced by the structure of FIGS. 1 and 2 is illustrated in FIG. 4, where each adjusting screw 45a is threaded into a boss 54 mounted on the top of the respective bracket 38 of each of the wheels 35. This boss is proportioned to work in the hole 46 of the spring 36 when in operating position. Above the wheel 46, the ledge 22 is provided with a hole 55 which also will pass the boss 54. The head of each screw 45a is stopped by the under face of the overlying wall 18 of the frame member 14 when the screen weight is borne by the respective wheels. For the purpose of adjustment of each screw 45a, the hole 55a is provided through the top wall 16 and through the underlying wall 18 immediately above each hole 55 to receive a small screwdriver for engaging the head of the screw 45a. Such hole 55a is smaller than the holes 46 and 55 and smaller than the head of the screw, which head therefore strikes the wall 18 beyond the hole edges. This arrangement provides adjustment comparable to that of the structure of FIG. 2.

Characteristically, the upper end of the sliding screen panel is also provided with means to engage and follow some kind of track or guide. Commonly, a non-metallic slide is mounted in the upper horizontal rail 14 of the screen panel to travel in frictional engagement with an overhead track. Such a common arrangement is illustrated in FIGS. 5 and 6. Here, the overhead track is like the track 50 of FIGS. 1 and 2 and comprises a track body 50a and a guide member 52a which depends from the body member 50a. In this instance, a pair of spaced U-shaped plastic runners 56 near opposite ends of the rail 14 are employed, these runners 56 being adequately rigid for the purpose and yet having slight flexibility for a snug mounting in the outer shallow open channel 28 of the upper frame member 14. Integral overhanging flanges 57 are provided to bear upon the outer folded edges of such frame member 14. Characteristically, the bottom wall 30 of the channel 28 is apertured at 58 (FIG. 6) for the purpose of snapping therethrough the inner end of each U-shaped runner 56. Slightly bulging detents 59 provide for such snap action and the yieldability of the plastic material of which the runners are formed permits such action.

Another common form for a slide mounting at the top of the upper frame member 14 is illustrated in FIG. 7. Here, the overhead track 60 is provided with two depending spaced guide sections 62 adapted to slidingly receive between them a relatively rigid plastic runner 63 of general T-shape which is slightly bulged at the lower end of the stem of the T for snapping into the outer shallow channel 28 as illustrated. In each of the instances of FIGS. 5, 6 and 7, sliding movement of the upper end of the door panel is adequately provided. Also, adequate vertical spacing is provided between the bodies of the tracks 50a and 60 and the runners 56 and 63 to provide for necessary upward movement of the screen panel bodily when the supporting wheels 35 are to be lifted from the track 50 for removal purposes, or for replacement purposes.

Especially since the bottom supporting wheels 35 are spring mounted, a desirable means for positioning the upper end of the sliding screen panel also includes spring mounted wheels, as illustrated at the top of FIG. 1. In this instance, the same overhead track 50a with its depending guide member 52a may be used as in FIGS. 5 and 6, and wheels 65 like the wheels 35 may be mounted on reversely bent springs 66 similar to the springs 36 and brackets 68 like the brackets 38 used for journal mountings 70 like the mountings 40. The stationary end of each leaf spring 66 is desirably retained in operative position through the medium of a laterally offset terminal tongue 72 which is received in a deep detent or aperture 74 formed in the wall 22 of the frame member 14. By such means, the wheels 65 will not be displaced longitudinally from operating position, but the tongue 72 may be withdrawn from the detents 74 by any appropriate tool, when necessary. Here again, when the screen panel is removed, projection of the wheels 65 from the openings 34 will be limited by engagement of the swinging portions of the springs 66 with the adjacent portions of the wall 30 at the openings 34.

From the foregoing, it will be apparent that I have provided spring-carried roller mountings for sliding screen panels whereby wheels traveling upon a track for supporting and guiding a panel will be at all times urged downward by such spring mountings into engagement with the track to prevent unintentional disengagement or jumping of the wheels from the track while at the same time providing for intentional disengagement when desired. Since various modifications will become apparent to those skilled in the art, it is intended to cover all such forms as fall within the scope of the patent claims.

The invention claimed is:
1. In combination:
 a sliding frame structure to be supported in a vertical position;
 a horizontally positioned bottom frame member having a vertically disposed channel extending longitudinally of such member and providing a downwardly directed opening;
 a wheel mounted in said channel at said opening to carry weight of said frame structure and provided with means to engage and run upon a track for supporting said frame structure;
 mounting means in which said wheel is rotatably mounted;
 a spring connected with said frame member for yieldingly positioning said mounting means and its wheel in said channel and to urge said wheel downwardly in said channel and said opening; and
 adjustable stop means interengaging between said frame member and said wheel mounting means for adjusting the operating position of said wheel relative to said frame member and said channel, said adjustable stop means being a screw threaded into a portion of said frame member above said channel, and said spring being a leaf spring connected at one end to said frame member and at the other end to said wheel mounting means opposite said adjusting screw.

2. A combination as in claim 1 wherein said spring is connected at one end to said frame member and at the other end to said wheel mounting, and is provided adjacent said other end with an opening through which said adjusting screw passes into engagement with said mounting means.

3. A combination as in claim 1 wherein said one end of said spring is located adjacent said adjusting screw and is positioned by projection of said screw through an aperture in the spring.

4. In combination:
 a sliding frame structure to be supported in an upright position in an opening of a building;
 a frame having vertical side members, an upper horizontally positioned hollow frame member having an upwardly directed horizontal channel, a lower horizontally positioned hollow frame member having a downwardly directed horizontal open channel, and a vertically disposed enclosed channel connected with said open channel by spaced openings;
 vertically positioned wheels mounted in said openings and in said open and enclosed channels of said lower frame member to carry weight of said frame structure and having means to travel on a track for supporting said structure;
 mounting means in which said wheels are respectively journaled;
 elongated springs horizontally disposed in said enclosed channel and connecting the respective wheel mounting means with said lower frame member and yieldingly positioning said wheel mounting means and wheels at said openings; and
 adjusting means in said lower frame member above said spring portions connected to said wheel mounting means and bearing on the springs and wheel mounting means for adjusting the innermost positions of said wheels in their yielding movements.

5. A combination as in claim 4 wherein said upper frame member also has an enclosed channel connected with said upwardly directed channel by openings, wheels are mounted in such openings of said upper frame member, and horizontal elongated springs carrying said wheels are mounted in the enclosed channel of said upper frame member for urging the corresponding wheels into engagement with overhead guide means, whereby to cushion such wheels against said overhead guide means.

6. A combination as in claim 4 wherein said springs are reversely bent leaf springs and said adjusting means are screws engaging and retaining one end of each of the respective leaf springs.

7. A combination as in claim 6 wherein each said adjusting screw which positions one end of the respective reversely bent leaf spring passes through an opening in such one end and bears upon the respective mounting for the respective wheel to adjust such wheel at a given limit of inward motion.

8. In combination:
a sliding frame structure to be supported in an upright position in an opening of a building;
a frame having vertical side members, an upper horizontally positioned hollow frame member having an upwardly directed horizontal channel, a lower horizontally positioned hollow frame member having a downwardly directed horizontal open channel, and a vertically disposed enclosed channel connected with said open channel by spaced openings;
vertically positioned wheels mounted in said openings and in said open and enclosed channels of said lower frame member to carry weight of said frame structure and having means to travel on a track for supporting said structure;
mounting means in which said wheels are respectively journaled;
springs in said enclosed channel and connecting the respective wheel mounting means with said lower frame member and yieldingly positioning said wheel mounting means and wheels at said openings; and
adjusting means in said lower frame member and bearing on the wheel mounting means for adjusting the innermost positions of said wheels, said springs being reversely bent leaf springs and said adjusting means being screws engaging and retaining one end of each of the respective leaf springs, each of said springs having an opening in such one end and the respective adjusting screw passing through such opening, and bearing upon the respective mounting to adjust the respective wheel at a given limit of inward motion.

References Cited in the file of this patent

UNITED STATES PATENTS

| | | |
|---|---|---|
| 162,930 | Knapp | May 4, 1875 |
| 183,857 | Laauwe | Oct. 31, 1876 |
| 912,382 | Keeler | Feb. 16, 1909 |
| 1,637,194 | Koop | July 26, 1927 |
| 2,804,181 | Haynes | Aug. 27, 1957 |
| 2,867,859 | Brink et al. | Jan. 13, 1959 |
| 2,867,860 | Anderson | Jan. 13, 1959 |
| 2,870,882 | Tolman | Jan. 27, 1959 |
| 2,903,755 | Romanoski | Sept. 15, 1959 |

FOREIGN PATENTS

| | | |
|---|---|---|
| 2,176 | Great Britain | Jan. 28, 1910 |
| 394,236 | Great Britain | June 22, 1933 |
| 674,995 | Great Britain | July 2, 1952 |